United States Patent
Gallegos et al.

(10) Patent No.: US 11,489,985 B2
(45) Date of Patent: Nov. 1, 2022

(54) SYSTEM AND METHOD FOR PRINTING LARGE FILES FROM A MEMORY CONSTRAINED MOBILE DEVICE

(71) Applicant: Toshiba TEC Kabushiki Kaisha, Shinagawa-ku (JP)

(72) Inventors: Guillermo Hernandez Gallegos, Jalisco (MX); Kevin Marquez Vaca, Jalisco (MX)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/181,750

(22) Filed: Feb. 22, 2021

(65) Prior Publication Data

US 2022/0272227 A1 Aug. 25, 2022

(51) Int. Cl.
*H04N 1/32* (2006.01)
*H04N 1/00* (2006.01)
*H04N 1/393* (2006.01)
*H04N 1/23* (2006.01)

(52) U.S. Cl.
CPC ....... *H04N 1/32454* (2013.01); *H04N 1/0044* (2013.01); *H04N 1/2361* (2013.01); *H04N 1/32122* (2013.01); *H04N 1/32448* (2013.01); *H04N 1/3935* (2013.01)

(58) Field of Classification Search
CPC .......... H04N 1/00482; H04N 1/32454; H04N 1/32448; H04N 1/393; H04N 1/3935; H04N 2201/212; H04N 2201/325; H04N 2201/33321; H04N 2201/33328; H04N 2201/214; H04N 2201/3298; H04N 1/0009; H04N 1/00148; H04N 1/00177; G06K 15/1843; G06K 15/1861; G06K 15/1865

See application file for complete search history.

(56) References Cited

U.S. PATENT DOCUMENTS

| | | | |
|---|---|---|---|
| 2004/0263630 A1* | 12/2004 | Rokutanda | H04N 1/32363 348/207.1 |
| 2009/0089533 A1* | 4/2009 | Nogawa | G06F 3/1245 711/171 |
| 2009/0161971 A1* | 6/2009 | Nogawa | G06F 3/1285 382/232 |

* cited by examiner

*Primary Examiner* — Kent Yip
(74) *Attorney, Agent, or Firm* — Ulmer & Berne LLP; John X. Garred

(57) ABSTRACT

A system and method for printing large files from a memory constrained mobile device analyzes image files to determine whether decompressing them for display or printing would result in image data exceeding device capacity. If not, the image data is displayed on the device and sent to a printer. If so, metadata in the image files is altered such that image data is generated at a lower resolution before decompression for displaying and printing.

20 Claims, 4 Drawing Sheets

SYSTEM AND METHOD FOR PRINTING LARGE FILES FROM A MEMORY CONSTRAINED MOBILE DEVICE

TECHNICAL FIELD

This application relates generally to printing images from mobile devices.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Electronic documents are routed to MFPs for printing via direct wireless or wired transfer, either directly or via a network. Earlier systems routed documents from a user's fixed workstation. More recently, users send their print jobs from mobile devices. Print jobs may include printing of digital images.

BRIEF DESCRIPTION OF THE DRAWINGS

Various embodiments will become better understood with regard to the following description, appended claims and accompanying drawings wherein:

DETAILED DESCRIPTION

Figure 1:
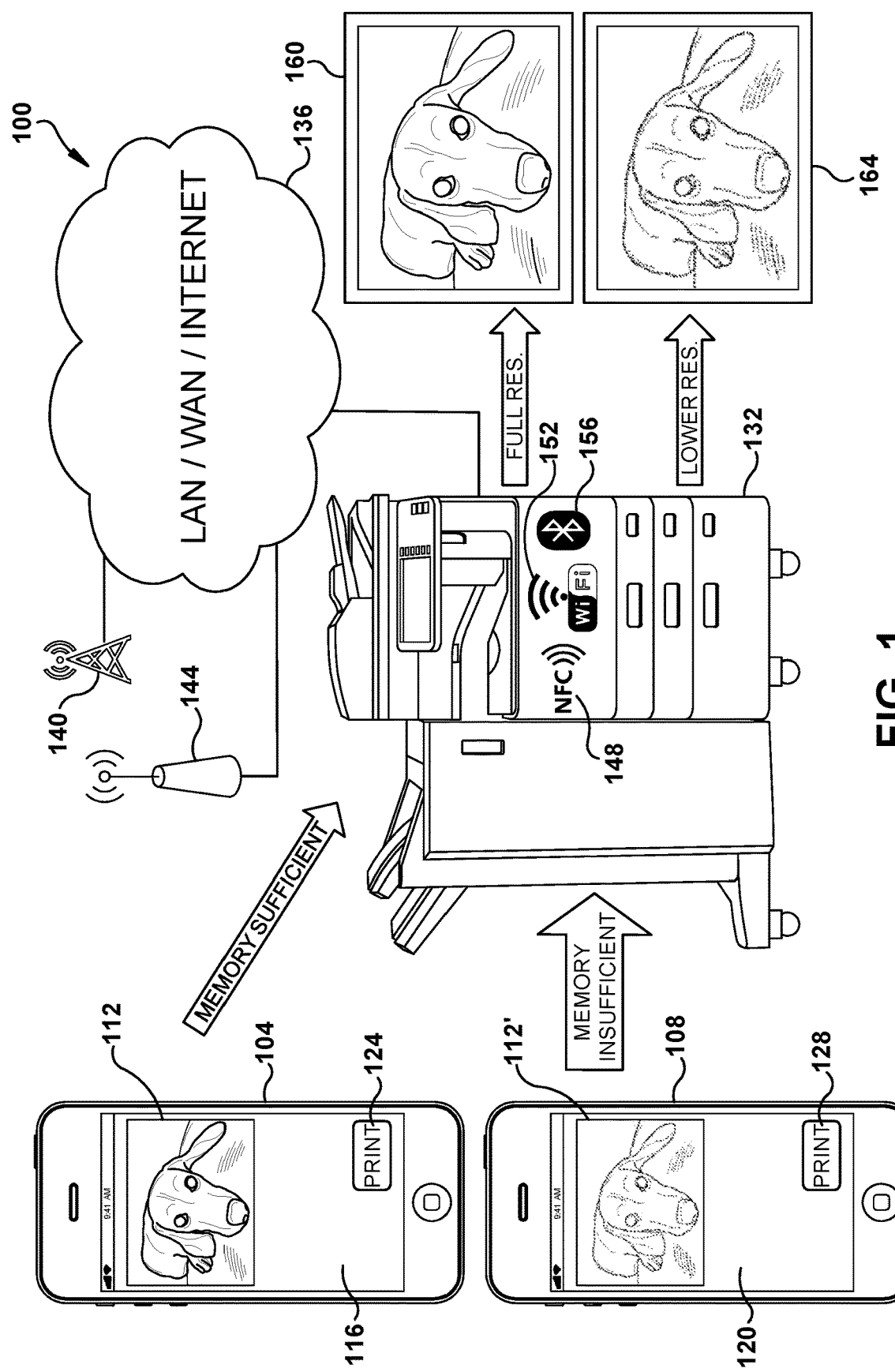
FIG. 1 is an example embodiment of a system for printing large files from a memory constrained mobile device.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

When digital images are created, such as by a digital camera or a document scanner, they are typically captured in what is referred to as a raw format file. There are many different raw formats in use by different manufacturers of digital image capture equipment. Raw format files are so named as they are not yet processed and therefore are not ready to be printed or edited with a bitmap graphics editor. Normally, the image is processed by a raw converter in a wide-gamut internal color space where precise adjustments can be made before conversion to a positive file format such as TIFF (Tagged Information File Format), PNG (Portable Network Graphics) or JPEG (Joint Photographic Experts Group) for storage, printing, or further manipulation. Positive files include files that stored images in a compressed or uncompressed format. Some compressed formats are lossless, such as PNG, meaning that they preserve a perfect copy of an original, uncompressed image. Other compressed formats, such as the popular JPG format, are lossy which may generate an image that appears to be perfect, but is not. There is a tradeoff between digital image size and image quality with lossy compression formats. Images can be compressed with a specified compression rate. Compression information can be encoded in compressed image metadata. Example embodiments herein reference the JPEG format for convenience. It is to be understood that any suitable compression format may also be used.

When a digital image file, such as a JPEG, is to be printed or displayed, it must first be decoded. Decoding the file generates a display image file that can be much larger than the JPEG file itself. This is not problematic when a digital device has sufficient available memory with which to work.

While it is desirable to print documents directly from mobile devices, many mobile devices, particularly older tablets and phones, do not have sufficient memory to decompress a document and show the preview on the screen prior to printing. The device does not know the size of a document to be uncompressed. If, during decompression, memory capacity is exceeded, the mobile device can fail abruptly, causing an application or system crash after a potentially long wait-time.

The afore-noted problem is addressed by an embedded software routine running on a memory constrained device. It functions to analyze the mobile devices capabilities and predict if the procedure can be performed. If the system determines that the large file has to be optimized it will inspect the source file and adapt its compression rate, suitably by editing image file metadata. This prevents a mobile application crash or system crash due to rapid expansion (decompression) of the very large files. For example, a large image may be 100 Mb, or larger. In the example embodiment, a device operating system and processor work in conjunction with an application to efficiently handle such large files, and display and print them, even with a handheld mobile device with low hardware resources.

The embedded software routine functions to analyze device capabilities and predict if the procedure will be performed. If the system determines that a large file has to be optimized, it will inspect its source file and adapt its compression rate. This prevents, for example, crash of a mobile application or system crash due to rapid file decompression.

In example embodiments herein, large image files are modified prior to decompression by downsizing image resolution to create a smaller, compressed image file. This smaller file is then decompressed for display and storage it in the device's RAM. This is accomplished by first determining a maximum acceptable size for any image on the user device. The routine suitably gets trained by both a programmer and by external variables, such as de current device's hardware capabilities. Metadata of the compressed file is analyzed to determine how much the image should be reduced based on the number of pixels from the metadata. A new, lower resolution file is created, decoded and displayed with a size smaller than the maximum acceptable size respecting the aspect ratio of the original image. This is suitably aided by suitable hardware acceleration. Thus, a new image file exists that is optimized for display on the mobile device's display and for printing, such as to any suitable MFP printer. Use of a modified image file can save substantial processor and memory usage, as well as speeding up print time.

In accordance with the subject application, FIG. 1 illustrates an example embodiment of a system 100 for printing large files from a memory constrained mobile device. Mobile devices 104 and 108 are illustrated as smartphones. It is to be understood that any device, such as a tablet, smartwatch or notebook computer can be substituted. In the illustrated example, mobile device 104 has sufficient memory resources to decode, display and print image 112 at full image file resolution. Mobile device 108 has insufficient memory to accomplish this. Thus, in accordance with embodiments disclosed herein, image 112' displayed on touchscreen 120 of mobile device 108 is a lower resolution rendering of print image 112. Mobile devices 104 and 108 are both enabled for printing, suitably by selecting print buttons 124 and 128, respectively. The mobile devices are in data communication with a printer, illustrated by MFP 132, by any suitably wireless or wired data connection, such as via network cloud 136. Network cloud 136 is suitably comprised of a local area network (LAN), a wide area network (LAN), which may comprise the Internet, or any suitable combination thereof. Data communication may be via cell tower 140, Wi-Fi hotspot 144, or direct optical or radio frequency connection, such as near field communication (NFC) 148, Wi-Fi direct connection 152 or Bluetooth connection 156.

MFP 132 receives a full resolution image from mobile device 104 and renders printout 160 at full resolution. MFP 132 receives a reduced resolution image from mobile device 108 and renders printout 164 at reduced resolution. While full image resolution may be preferable, a lower resolution printout allows printing when none would otherwise be possible.

Figure 2:
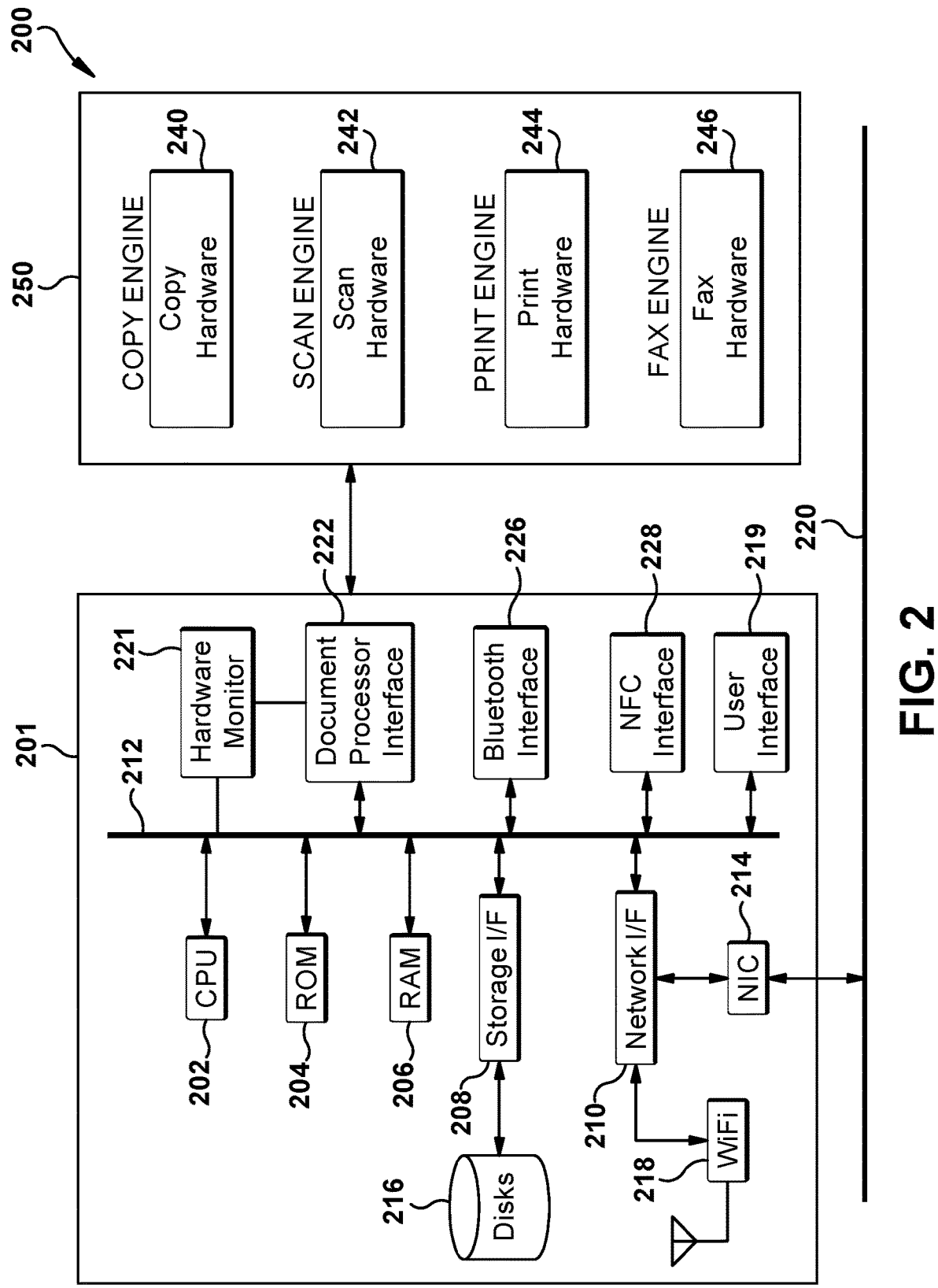
FIG. 2 is an example embodiment of a networked digital device such as a multifunction peripheral.

Turning now to FIG. 2, illustrated is an example embodiment of a networked digital device comprised of document rendering system 200 suitably comprised within an MFP, such as with MFP 132 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 21 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with the document rendering system 200, including MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
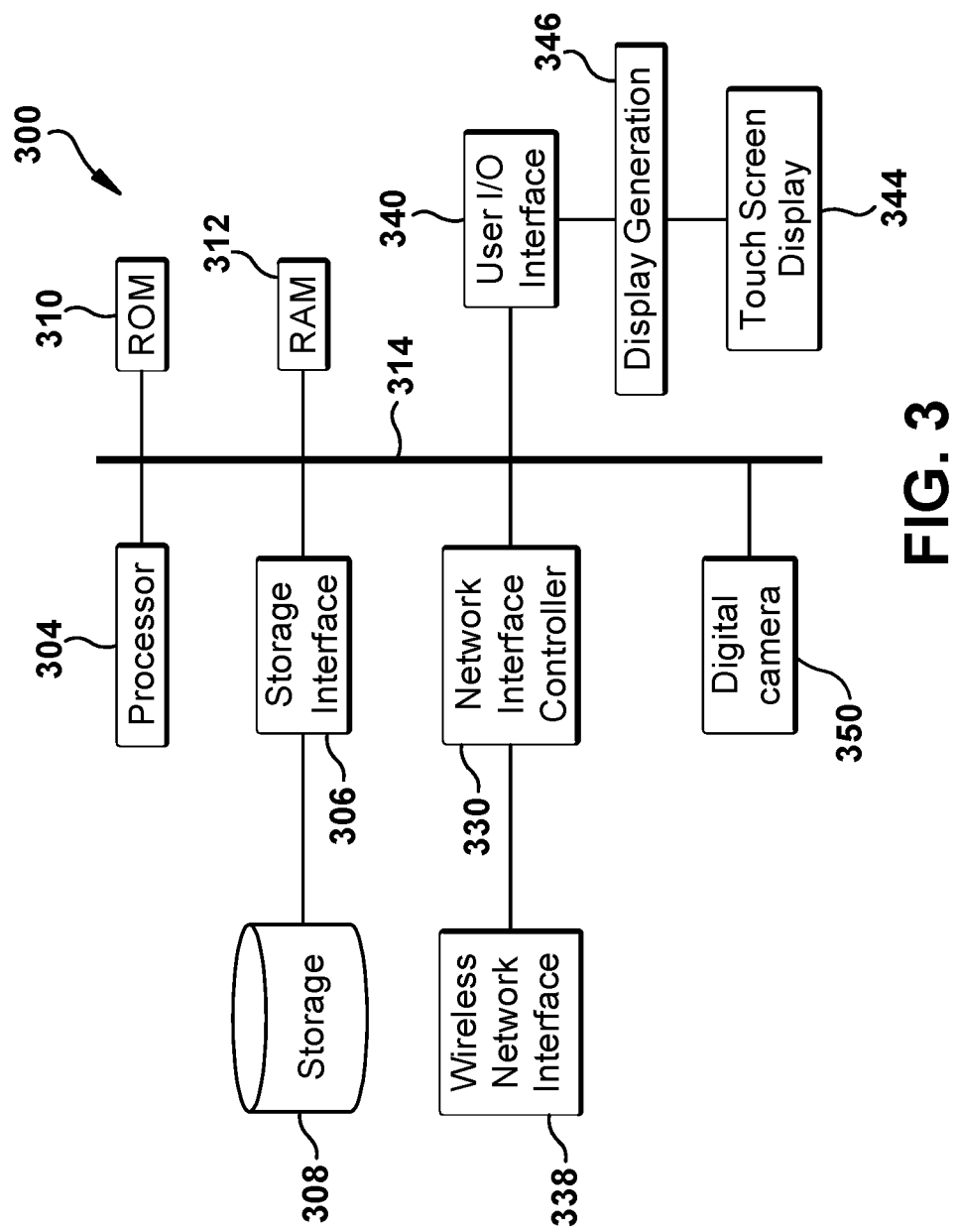
FIG. 3 is an example embodiment of a digital device system such as a smartphone, tablet or notebook computer.

Turning now to FIG. 3, illustrated is an example embodiment of a digital data processing device 300 such as mobile devices 104 and 108 of FIG. 1. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. A network interface controller 330 suitably provides a gateway for data communication with other devices, such as via wireless network interface 338. A user input/output interface 340 suitably provides display generator 346 providing a user interface via touchscreen display 344, suitably displaying images from display generator 346. It will be understood that the computational platform to realize the system as detailed further below is suitably implemented on any or all of devices as described above.

Figure 4:
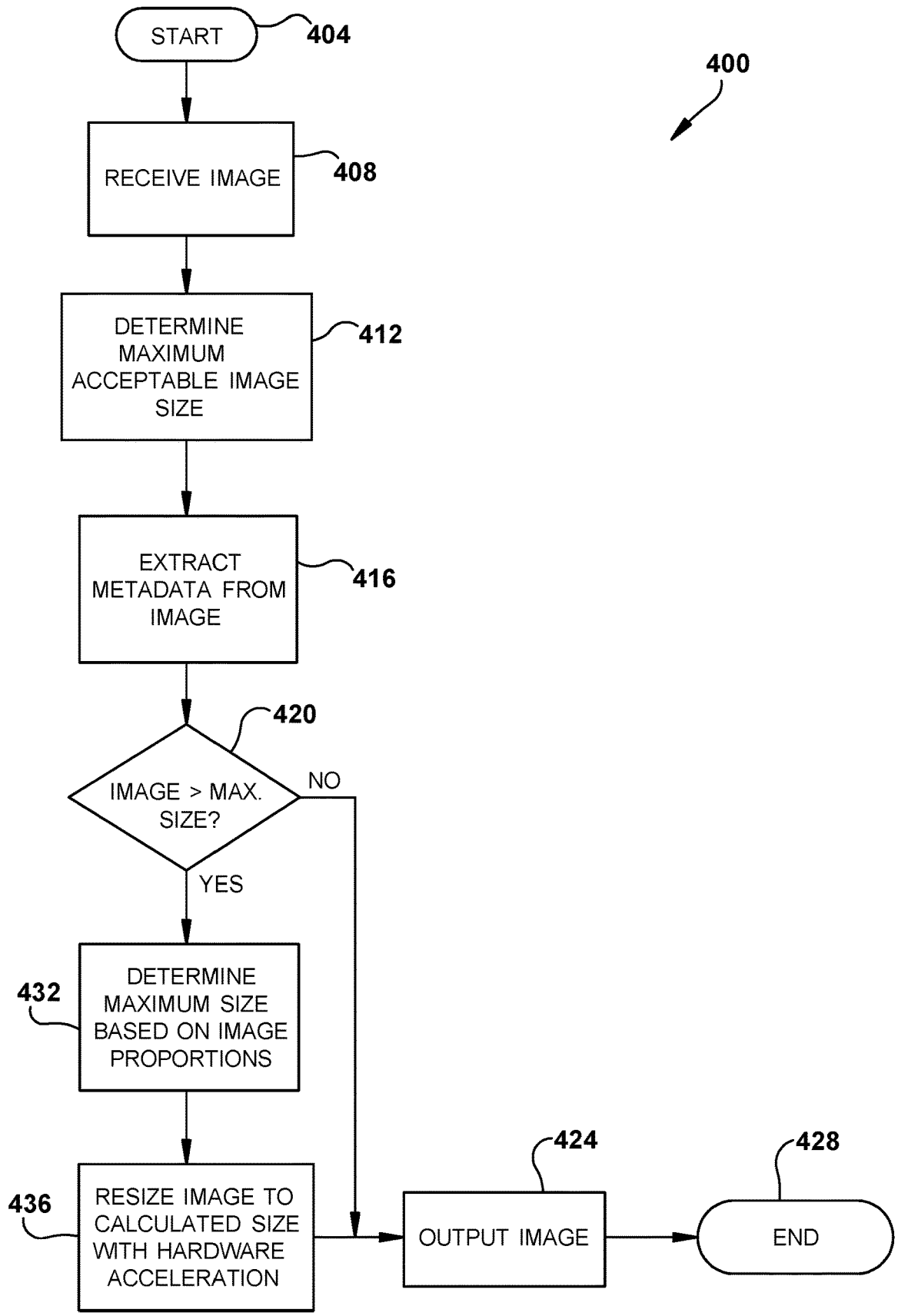
FIG. 4 is flowchart of an example embodiment a system for printing large files from a memory constrained mobile device.

FIG. 4 is a flowchart 400 of an example embodiment a system for printing large files from a memory constrained mobile device. The process commences at block 404, and an image is received and stored in memory at block 408. A processor determines a maximum acceptable image size at block 412 and extracts image metadata at block 416. If the extracted image metadata indicates that a generated image would not exceed device memory capacity at block 420, the image is output at block 424, suitably to a device display, a printer or both, for displaying or printing at full image resolution and the process ends at block 428. If the extracted image data indicates that a generated image would exceed device memory capacity at block 420, a maximum size that can be handled with available memory is determined at block 432, the image is resized at block 436. The resized image is output at block 424, such as by displaying, printing, or both at block 424, and the process ends at block 428.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a user interface including a user input and a display;
   a data interface;
   memory storing a compressed electronic image data including resolution data corresponding to a resolution of a resultant image if the compressed electronic image was decompressed;

a processor configured to determine available memory for decompression of the compressed electronic image data;

the processor further configured determine, from the resolution data of the compressed electronic image data, a required memory to decompress the compressed electronic image data; and the processor further configured to determine that the required memory exceeds the available memory; wherein upon a determination that the required memory exceeds the available memory, the processor further configured to modify the resolution data of the compressed image data to generate lower resolution compressed electronic image data and decompress the lower resolution electronic image data using the available memory.

2. The system of claim 1 wherein the processor is further configured to determine the required memory in accordance with metadata associated with the compressed electronic image data stored in the memory.

3. The system of claim 2 wherein the processor is further configured to set a level of a lower resolution in accordance with the available memory.

4. The system of claim 3 wherein the processor is further configured to alter the metadata in accordance with a set lower resolution level.

5. The system of claim 4 wherein the processor is further configured to determine the available memory and the required memory responsive to receipt of a print command from an associated user via the user interface.

6. The system of claim 5 wherein the processor is further configured to show a lower resolution electronic image from decompressed lower resolution electronic image data.

7. The system of claim 5 wherein the processor is further configured to send decompressed lower resolution electronic image data to an associated printer via the data interface.

8. The system of claim 2 wherein the processor is further configured to determine that the required memory exceeds the available memory in accordance with a pixel count determined from the metadata.

9. A method comprising:

storing a compressed electronic image data in memory, the compressed electronic image data including resolution data corresponding to a resolution of resultant image if the compressed image data was decompressed;

determining available memory for decompression of the compressed electronic image data;

determining, from the resolution data of the compressed electronic image, required memory to decompress the compressed electronic image data; and determining that required memory exceeds available memory; wherein upon a determination that the required memory exceeds the available memory, modifying the resolution data of the compressed electronic image data to form lower resolution compressed electronic image data and, decompress the lower resolution compressed electronic image data using the available memory.

10. The method of claim 9 further comprising a further determination of required memory in accordance with metadata associated with the compressed electronic image data stored in the memory.

11. The method of claim 10 further comprising setting a level of a lower resolution in accordance with the available memory.

12. The method of claim 11 further comprising altering the metadata in accordance with a set lower resolution level.

13. The method of claim 12 further comprising a further determination of available memory and the required memory responsive to receipt of a print command from an associated user via a user interface.

14. The method of claim 13 further comprising showing a lower resolution electronic image from decompressed lower resolution electronic image data.

15. The method of claim 13 further comprising sending decompressed lower resolution electronic image data to an associated printer via a data interface.

16. The method of claim 10 further comprising determining that the required memory exceeds the available memory includes determining a pixel count from the metadata.

17. A system comprising:

a data interface configured to receive a compressed digital image into memory;

a processor configured to receive a print instruction for the compressed digital image via a user interface input;

the processor configured to, responsive to a received print instruction, determine, from resolution data disposed in the compress digital image, a size of a decompressed digital image associated with the compressed digital image;

determine available memory, and determine whether the available memory is sufficient to decompress the compressed digital image; wherein upon a first determination that the available memory is sufficient to decompress the decompressed digital image, decompress the compressed digital image, show a first image of the decompressed digital image on a user interface display, and send the decompressed digital image to an associated printer, upon a second determination that the available memory is insufficient to decompress the compressed digital image, modify the resolution data of the compressed digital image to generate lower resolution compressed digital image from the compressed digital image, decompress a lower resolution compressed digital image from the lower resolution compressed digital image, show a second image of a decompressed lower resolution digital image on the display, and send the decompressed lower resolution digital image to a printer.

18. The system of claim 17 wherein the processor is further configured to determine the size of the decompressed digital image in accordance with metadata in the compressed digital image.

19. The system of claim 18 wherein the processor is further configured to generate the lower resolution compressed digital image by altering the metadata.

20. The system of claim 17 wherein the processor is further configured to set a lower resolution to a highest possible resolution based on the available memory.

* * * * *